G. WOODS.

Assignor to himself and G. P. CARTER.

Method of Drying Lumber.

No. 8,129. Reissued March 19, 1878.

*Witnesses:*
*Henry Chadbourn.*
*Willis E. Flint.*

*Inventor:*
*George Woods*
*by Alban Andrén.*
*his Atty.*

UNITED STATES PATENT OFFICE.

GEORGE WOODS, OF CAMBRIDGEPORT, MASSACHUSETTS, ASSIGNOR TO HIMSELF AND GEORGE P. CARTER.

IMPROVEMENT IN METHODS OF DRYING LUMBER.

Specification forming part of Letters Patent No. 154,205, dated August 18, 1874; Reissue No. 8,129, dated March 19, 1878; application filed February 14, 1878.

*To all whom it may concern:*

Be it known that I, GEORGE WOODS, of Cambridgeport, in the county of Middlesex and State of Massachusetts, have invented certain new and useful Improvements in Drying Lumber, &c.; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to a new and useful process for drying lumber, &c.; and consists in the employment of a pipe or pipes, or receptacle, or other surface-condenser, containing circulating water of a low temperature, to which condenser the moist vapors that pass off from the lumber, &c., while being heated in a drying-chamber, are accessible, and, as the vapors come in contact with such condenser containing water in circulation, they are condensed and allowed to escape in liquid form.

The accompanying drawing will serve to show the general principles upon which my improved process is carried out; but I wish to state that I do not confine myself, in the carrying out of my invention, to the use of any particular shape or construction or form of condenser, or to the exact arrangement as shown in said drawing, as such construction, form, or arrangement forms no essential part of my invention, the gist of which is the process of heating lumber, &c., and thereby evaporating the moisture which is brought in contact with a condenser containing water in circulation, on the surface of which condenser the moisture will condense in liquid form, in which condition it is withdrawn from and allowed to escape freely from the condenser and the drying-chamber.

Figure 2:
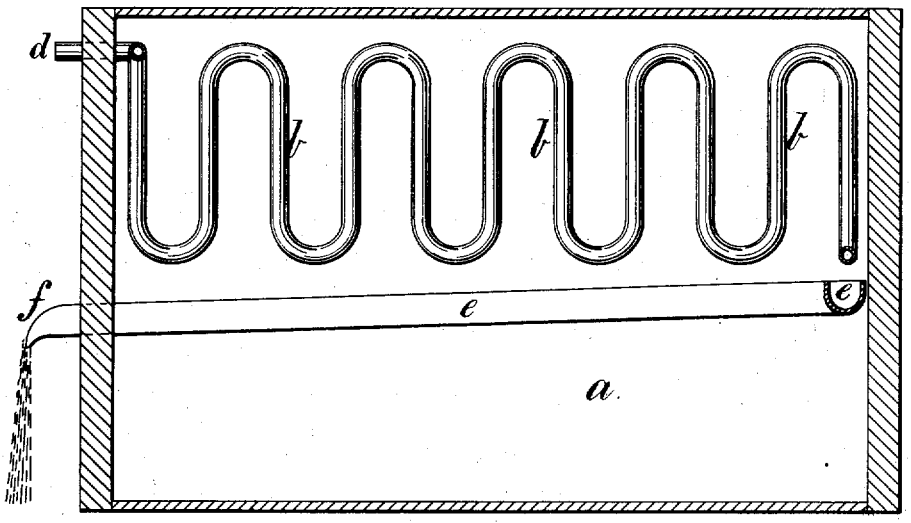
Figure 1:
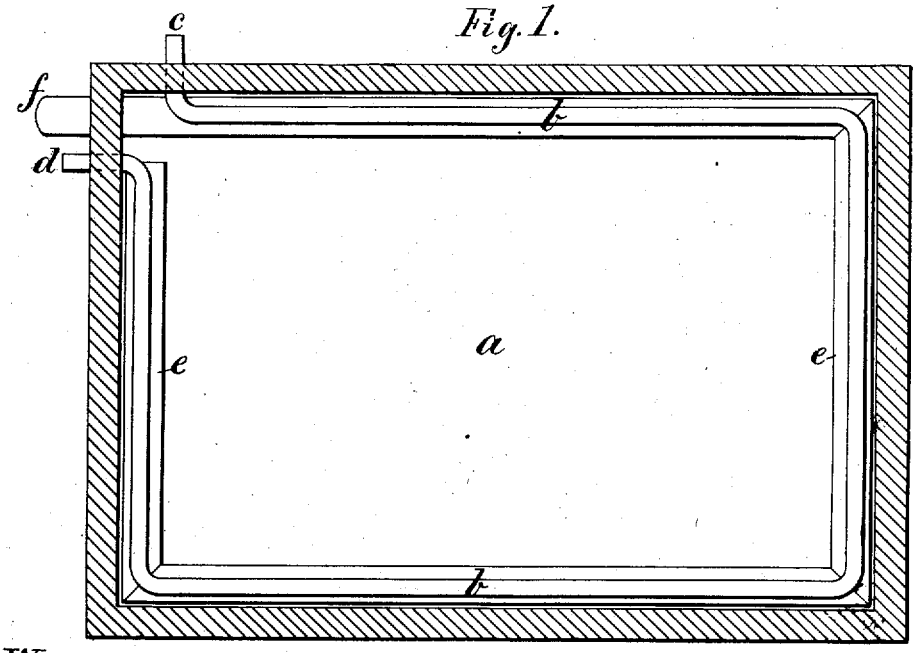

In the drawings, Figure 1 represents a plan view of a drying-chamber, and Fig. 2 represents a vertical section of the same.

*a* represents a drying room or chamber, heated in the usual manner. *b b* represent a pipe, receptacle, or condenser, through which cold water is kept in circulation.

The cold water, after being circulated through the pipe or condenser *b*, is forced out at *d*, from which it may be conducted to a steam-boiler as feed-water or otherwise, as may be desirable.

*e* represents a trough or conductor in which the condensed vapors on the condenser *b* drip, and from which they are conducted away from the drying-chamber and the condenser. The said conductor *e* terminates at *f*, outside of the drying-room, or in a similar manner.

The lumber or other articles that are to be dried may be suspended in the drying-room in any of the ordinary ways.

The operation of my improved process is as follows: After the lumber or other material that is to be dried is placed in the drying-chamber, I heat the atmosphere in the said chamber as usual, when the moist vapors that pass off by evaporation from the lumber, &c., come in contact with the condenser containing water in circulation, by which such vapors are condensed in liquid form and conducted away from the condenser.

In this manner I am able to dry lumber and other articles more rapidly and at a less expense as compared with the ordinary methods of drying now in use.

Having thus fully described the nature and operation of my invention, I wish to secure by Letters Patent, and claim—

1. The process, as herein described, for drying lumber, &c., consisting in forcing water through a receptacle or condenser in the heated drying-chamber, on the surface of which condenser the moisture from the lumber, &c., is condensed and conducted from the drying-room, in a manner as herein shown and set forth.

2. The process for drying lumber, &c., consisting in forcing water through a condenser to which the moisture that passes off from the lumber, &c., is accessible, and in contact with which such vapors or moisture are condensed and removed in a liquid form.

In testimony that I claim the foregoing I have hereunto set my hand this 7th day of February, 1878.

GEORGE WOODS.

Witnesses:

ALBAN ANDRÉN,

HENRY CHADBOURN.